TUNNEL DIODE MEMORY

Filed April 6, 1964 3 Sheets-Sheet 1

Inventors
Donal A. Meier
William Y. Wong
By: Louis A. Kline
John J. Matlago
Richard L. Renger
Their Attorneys.

Inventors.
Donal A. Meier
William Y. Wong
By: Louis A. Kline
John J. Matlago
Richard J. [signature]
Their Attorneys.

Column Drivers 26

Tunnel Rectifiers 24

Row Drivers 25

Inventors.
Donal A. Meier
William Y. Wong
By: Louis A. Kline
John J. Matlago
Richard J. Lenglee
Their Attorneys.

United States Patent Office 3,296,598
Patented Jan. 3, 1967

3,296,598

TUNNEL DIODE MEMORY

Donal A. Meier, Inglewood, and William Y. Wong, Los Angeles, Calif., assignors to The National Cash Register Company, Dayton, Ohio, a corporation of Maryland Filed Apr. 6, 1964, Ser. No. 357,570
7 Claims. (Cl. 340—173)

The present invention relates to information storage systems for random-access storage and retrieval of data and more particularly to a memory matrix and word selection circuits therefor utilizing negative-resistance semiconductor devices to provide improved memory circuits and an improved memory system.

In the improved memory system of the present invention, "Esaki" diodes, more commonly known as tunnel diodes, are utilized to provide improved high speed operation. The Esaki or tunnel diode consists of a p–n junction semiconductor which has certain advantages because its forward voltage-current operating characteristic contains a negative resistance region which is due to the "quantum-mechanical tunneling" of majority carriers across a very thin semiconductor junction. In this area of operation, the voltage-current characteristic has two stable regions of positive resistance separated by the negative resistance region. Operation between these two stable regions provides states for storage of binary signals, and switching from one region to another (destructive readout) produces a change in operating current which is sensed during readout.

The tunnel diode provides certain advantages for use as the basic memory element in a matrix for high-speed random access memories because of its fast switching speed and good stability under varying environmental conditions. Another important advantage of the tunnel diode is its low conductivity threshold voltage in the forward direction as well as the reverse direction. Additional advantages of the tunnel diode are: (1) mechanical simplicity (only two terminals for connections), and (2) stability of operation over a wide temperature range. Further, not only because of the tunnel diode's small size, but also because of low power consumption, the tunnel diode memory can be extremely compact. In view of the fact that the most desirable characteristics of a memory are increased operating speed, capacity and reliability, the tunnel diode memory arrangement of the present invention provides these characteristics throughout the memory matrix, word selection circuits and drivers.

The memory matrix of the present invention is operated in the voltage-mode and by current sensing of outputs of many tunnel diode-resistor memory cells at speeds higher than 10 megacycles, for example. The basic memory cell (storage for one bit) is composed of one tunnel diode, a series resistor and a parallel resistor. The value of the series resistor is such that two stable high and low current states are provided at each side of the negative resistance portion of the voltage-current characteristic. The level of the bias voltage is such that in the absence of input signals, the tunnel diode of each memory cell is capable of remaining in either of the two stable states. During operation, the states of any selected word group of memory cells are changed by increasing or decreasing the voltage across each memory cell of the selected word group. This increase or decrease in voltage across each memory cell, including the series resistor and tunnel diode and the parallel resistor, places the memory cells of the selected word group in a desired low or high current stable state. Accordingly, a write pulse and a digit pulse provide the necessary increase in voltage to place memory cells of any selected word group in a low current stable state for storing a binary 1; and a read pulse produces a decrease in voltage which returns the memory cells of a word group to the high current state; and any change in current state during readout produces a change in current $\Delta I$ that is differentially sensed as a binary 1. Thus, the stable current states of each memory cell make possible the storage of both binary information bits 0 and 1 in which one current state (high) represents the storage in the memory cell of a binary 0 and when switched to the other stable current state (low), represents the storage therein of a binary 1.

An operating cycle of the memory of the present invention includes both read and write cycles of operation and each cycle includes both read and write pulses in that order. The memory cells of any selected word group of the present memory matrix require only a very low voltage pulse for switching; therefore, a low impedance source supplies only very low level voltage read-write pulses to any selected word group of memory cells. With regard to readout or interrogation of the memory matrix, the information content of each memory cell of any selected word location is interrogated by applying a read pulse of a polarity such as to decrease the voltage across the memory cells to drive all of the tunnel diode memory elements to the binary 0, high current state (destructive readout).

Considering now only a single one of the memory cells of any selected word group, when an applied read pulse causes the tunnel diode to switch from the low current (binary 1) state to the high current (binary 0) state, a differential readout signal current is induced in the secondary winding of a respective differential current transformer having a primary winding connected across parallel signal outputs of this memory cell. The differential readout signal is produced by differential detection of the change in current ($\Delta I$) produced in this transformer primary winding as a result of the change from the stable low current state, corresponding to the binary 1, to the stable high current state, corresponding to binary 0. On the other hand, if the tunnel diode is already in the (binary 0) high current state, no switching current and no differential readout signal is produced. As a result, no readout signal (of the character produced during readout of a binary 1) is induced in the secondary winding (sense output) of the respective differential current transformer. Ideally, a complete absence of a differential current in this secondary winding would be indicative of the storage of a binary 0 in the respective interrogated memory cell. However, the voltage-current characteristic of tunnel diodes and other circuit components varies according to certain tolerances specified for these components. Therefore, in accordance with the present invention, each memory cell includes balanced parallel circuit paths, one path including the tunnel diode memory element and series resistor and the other path including a parallel resistor matched to the tunnel diode and series resistor. Thus, although some minimal differential current (noise) may be produced in the sense output in response to interrogation of a cell storing a binary 0, because of slight unmatched differences in characteristics of components, readout signals produced during switching of a cell are readily capable of being sensed in the differential transformer therefor.

Accordingly, the present invention provides a balanced circuit arrangement for individual memory cells of a digit plane which is capable of distinguishing between the low level differential readout signal current, produced during switching of the tunnel diode of a memory cell from low to high current states during readout of a binary 1, and noise produced merely as a result of interrogation by the read pulse being applied to the individual memory cells in binary 0 states. Also, because of the fast switching speed of a tunnel diode and relatively short time duration of the resulting differential readout signal produced upon the interrogation of a memory cell in a binary 1 state; propagation time relays of the parallel output paths of each of the memory cells are carefully controlled to avoid differential currents in the sense output, during readout of cells in the binary 0 state, since these differential currents cannot, in many instances, be distiguished from the differential readout signal for a binary 1. In accordance with the parallel circuit arrangement of the individual memory cells of the present invention, the foregoing difficulties are avoided and differential readout signals are produced upon interrogation of memory cells of a selected word group in the low current (binary 1) state, and any differential current (noise) produced upon interrogation of any selected memoy cell in the high current (binary 0) state can be readily distinguished from said differential readout signal. Accordingly, it is an object of the present invention to provide a tunnel diode memory matrix in which each of the memory cells comprises a balanced circuit arrangement including a tunnel diode, a series resistor and a parallel resistor in which the components individual thereto are disposed and arranged to poduce properly timed and balanced signal outputs in response to interrogation by a read-voltage pulse.

Another object of the present invention is to provide tunnel diode memory cells disposed in a symmetrical circuit arrangement of a memory plane in which opposing signals of the individual memory cells arrive simultaneously at the sense output for differential detection. Thus, because the propagation time delays of the balanced output signals of any one of the memory cells to the sense output of the respective memory plane are substantially equal, balanced opposing output signals produced during readout of binary 0 are coincident in time at the differential sense output for complete cancellation thereof and a clearly distinguishable differential readout signal is produced during readout of a binary 1.

A further object of the present invention is to provide a word organized memory in which the linear selection is provided by low impedance sources including a matrix of linear transformers and low impedance tunnel diode divers which provide the uniform, low level voltages necessary for switching a large number of tunnel diode memory cells in any selected word group.

Another important object of the present invention is to minimize noise produced during application of digit pulses to a tunnel diode memory matrix in order to provide for a memory having a large storage capacity and capable of operating at higher speeds than heretofore possible.

Other objects and features of the invention will become apparent to those skilled in the art as the disclosure is made in the following detailed description of a preferred embodiment of the invention as illustrated in the accompanying sheets of drawings in which.

Figure 2:
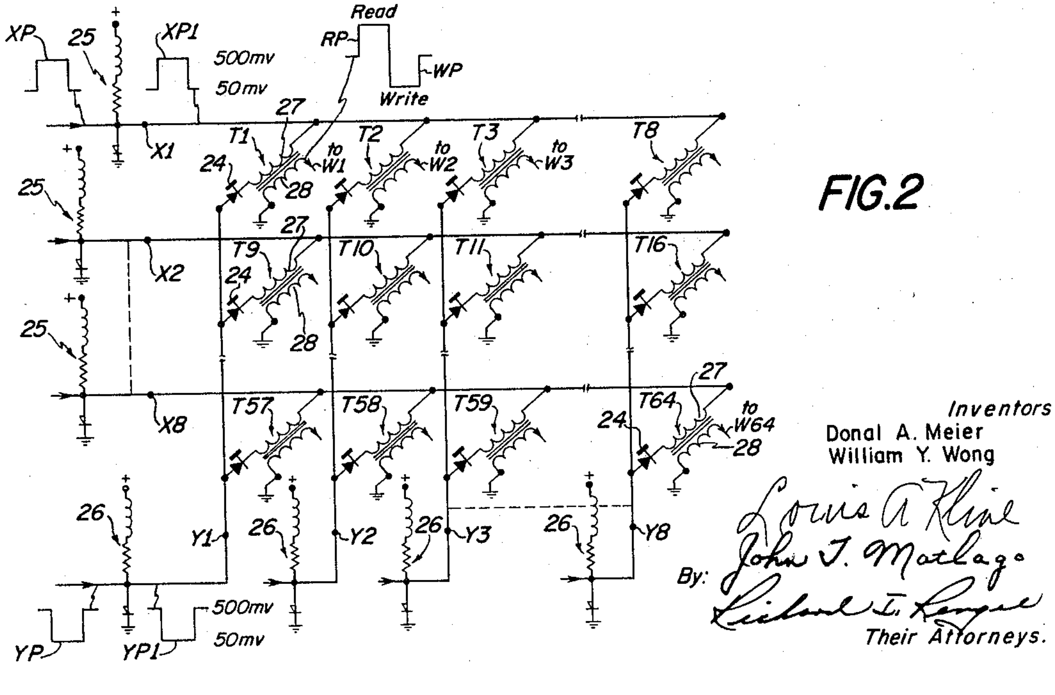
FIG. 2 is a schematic diagram of the memory selection circuits including the linear transformer array for supplying read and write pulses to any selected one of the word lines of the memory matrix shown in FIG. 1.
Figure 8:
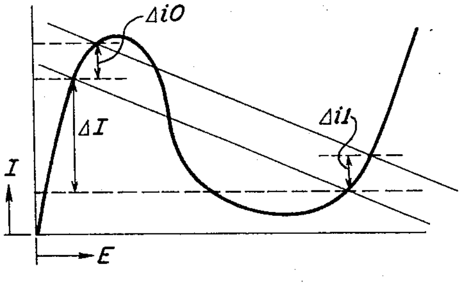
Figure 6:
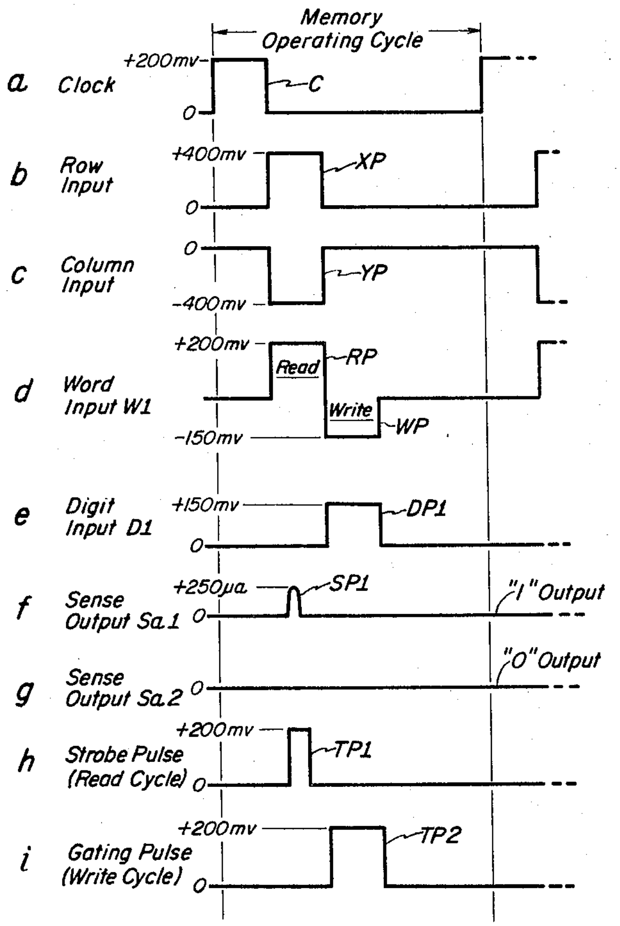
Figure 7:
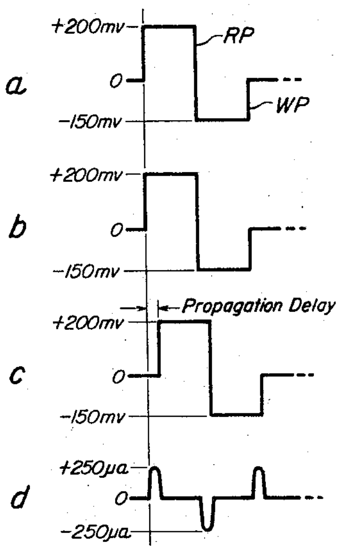

FIGS. *5a*, *5b* and *5c* are voltage-current operating characteristic curves for illustrating the operation of the memory selection circuits of FIG. 2;

FIG. 6 is a timing diagram showing typical waveforms produced during operating cycles of the memory system arrangement of the present invention for illustrating the operation thereof;

FIG. 7 is a timing diagram which shows certain waveforms to illustrate the manner in which uncontrolled propagation delays could adversely affect the memory operation; and FIG. 8 shows the tunnel diodes characteristic curve and conductance load lines of the circuit of typical memory cells in binary 0 and 1 states for comparing the changes in current produced by a digit pulse.

Figure 1:
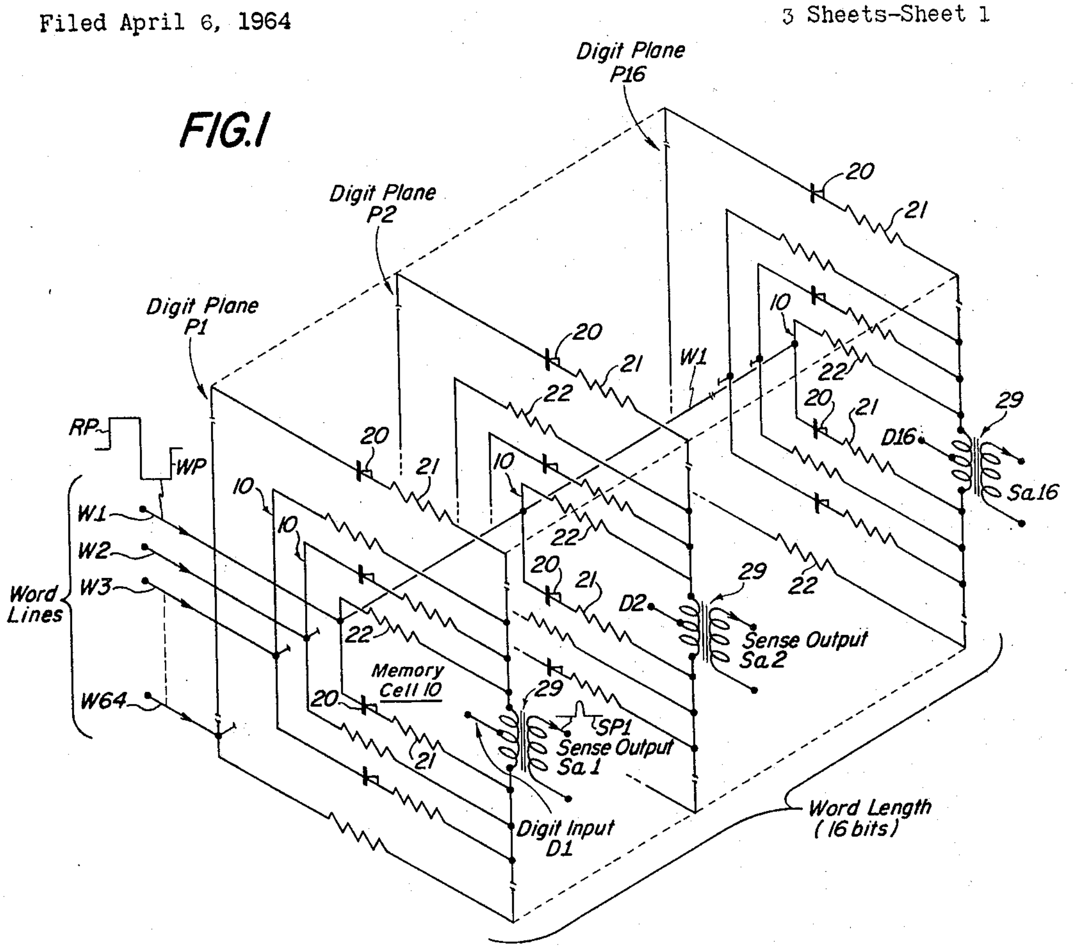
FIG. 1 is an isometric drawing, partly broken away, which provides a schematic illustration of the tunnel diode memory matrix according to the memory system arrangement of the present invention.

Referring now to FIG. 1 of the drawings, the memory matrix of the present invention is shown to include tunnel diode memory cells 10 symmetrically arranged in sixteen vertical memory digit planes P1, P2–P16. Each of the memory cells 10 comprises an individually balanced circuit arrangement including a tunnel diode 20, series resistor 21 and parallel resistor 22. As shown, the memory matrix is "word organized, wherein selectively supplying read-write pulse RP, WP to any one of sixty-four word lines W1, W2, W3–W64 applies these pulses to sixteen memory cells 10 of a corresponding word group. Each of the sixteen memory cells 10 of a word group is connected in parallel and located in a respective one of the sixteen memory digit planes P1, P2–P16 in order to read and write a single word of data (16 bits) in any selected word group of memory cells 10 during an operating cycle of the memory.

In FIG. 2, the memory selection circuits are shown to include an array of linear transformers T1–T64 and selectively applying a set of row and column drive pulses (e.g., XP1, YP1) to any one of these transformers T1–T64 (e.g., T1) produces read-write pulses RP, WP that are coupled to a respective one of the word lines W1, W2, W3–W64 and to the corresponding word group of sixteen memory cells 10 connected in parallel to the respective word line (e.g., W1). By the provision of low impedance voltage sources including transformers T1–T64, tunnel diode row drivers 25 and tunnel diode column drivers 26; the memory arrangement of the present invention retains high speed of operation of the tunnel diode throughout the entire system. As shown in FIG. 2, row and column drive pulses XP1 and YP1 are supplied by the selected pair of row and column drivers 25 and 26, in response to pulses XP, YP, to produce read-write pulses RP, WP on the secondary winding 28 of a single transformer T1, for example. The read-write pulses RP, WP, induced in the secondary winding 28, are coupled to the word line W1 for readout and storage of data in the respective word group of memory cells 10 of the tunnel diode memory matrix of FIG. 1. Since each of the sixteen memory cells 10 of any one word group is disposed in a separate one of the digit planes P1, P2–P16, changes in current ($\Delta I$), produced in memory cells 10 of any one group by switching of tunnel diodes from low to high current states, are detected by respective differential current transformers 29 to produce differential readout signals at respective sense outputs *Sa*1, *Sa*2–*Sa*16. The presence of a differential readout signal (e.g., SP1) at any one of the sense outputs (e.g., *Sa*1) indicates that a binary 1 is being read out of the respective memory cell 10 of the selected word group. The absence of a readout signal at any of the sense outputs *Sa*1, *Sa*2–*Sa*16 indicates that a binary 0 is being read out of the respective memory cell 10, e.g., sense output *Sa*2. In view thereof, certain circuit requirements for the individual memory cells 10 and digit planes P1, P2–P16 are important to proper operation of the memory matrix. Accordingly, the features of the individual memory cells 10 will be set forth in the following description of a typical memory cell 10 and a typical digit input D1 therefor.

Figure 3:
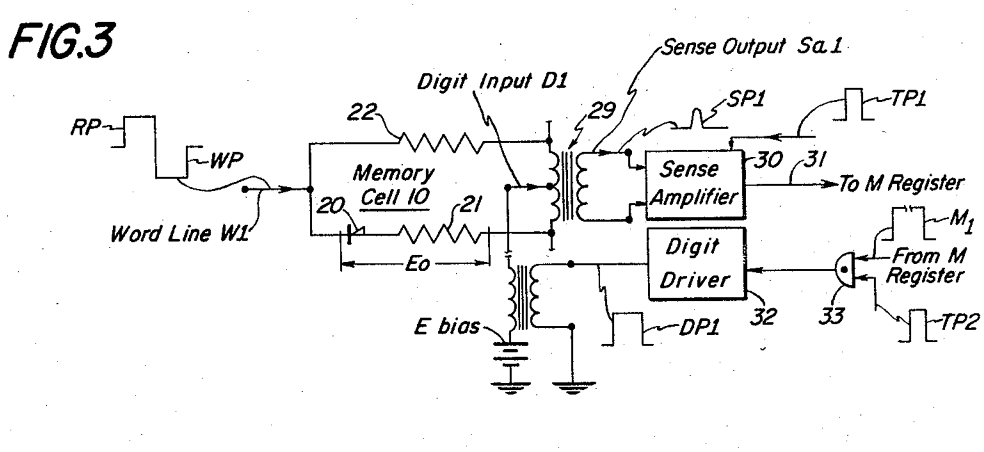
FIG. 3 is a schematic diagram of a typical memory cell of one of the digit planes of the memory matrix shown in FIG. 1 and typical circuits for this memory digit plane.

Referring to FIG. 3 for a detailed description of a typical memory cell 10 and the circuits for the digit plane P1, the individual memory cell 10 is shown therein to comprise the tunnel diode 20, the series resistor 21 and the parallel resistor 22. In general, the value of the series resistor 21 is larger than the negative resistance of the respective tunnel diode 20 to produce the voltage-current loop 40 (FIG. 4) and to provide stable, high and low current states at the points of intersection 41 and 42 of the vertical voltage bias line 43 and the loop 40. The change in current ΔI (FIG. 4) is the change in current produced as a result of switching of the tunnel diode memory element from the (binary 1) low current state to the (binary 0) high current state and is detected by the differential current transformer 29 to produce the differential readout signal SP1 at the sense output S*a*1. First, it should be noted that the circuit arrangement of the typical memory cell 10 provides for accurate balancing and matching of parallel circuits and timing of parallel output signals coupled to the differential current transformer 29. It is only the difference in these signals (resulting from a change in current ΔI) that is differentially detected by the differential current transformer 29 to produce the differential readout signal SP1 for a binary 1. In addition, the arrangement of memory cells 10 in any digit plane provides for noise cancellation produced during reading and writing by the balanced arrangement of the tunnel diodes of alternate memory cells on opposite sides of the primary winding of transformer 29. For example, this arrangement provides for placing non-linear currents Δ*i*0 and Δ*i*1 (FIG. 8) in opposition at the sense outputs for cancellation thereof.

Considering now, in detail, the balanced circuit arrangement including the individual resistors 21 and 22 of the memory cell 10, the value of the parallel resistor 22 is selected to provide a voltage-current characteristic having a slope substantially equal to the positive slope of the tunnel diode-resistor memory element in order to provide balanced parallel signal outputs to the opposite sides of the primary winding of transformer 29, except for changes in current ΔI. The value of the series resistor 21 is determined in accordance with the following inverse relationship, i.e., $R(\text{ohms})=1000/Ip$ where $Ip$ is the peak current of the tunnel diode in milliamperes. Both static and dynamic balancing of this circuit arrangement of the memory cell 10 results in very little, and preferably no differential current at the respective sense output when interrogating memory cell 10 in a binary 0 state and substantially reduces the noise (delta noise) in the sense output S*a*1 of digit plane P1 during writing operations. The term "delta noise" refers to the uncancelled current component produced in any one of the sense outputs S*a*1, S*a*2–S*a*16 when a digit pulse (e.g., DP1) is applied to the memory cells 10 of the digit planes P1, P2–P16, and is a direct result of differences in changes in current of memory cells 10 which are in different high (binary 0) and low (binary 1) stable states. In the balanced circuit arrangement of the memory cells 10 in the individual digit planes P1, P2–P16 of the present invention, as shown in FIG. 1, the changes in current of memory cells 10 are substantially the same as illustrated by Δ*i*0 and Δ*i*1 in FIG. 8. Further, as noted supra, the balanced arrangement in each of the digit planes P1, P2–P16, in which the tunnel diodes 20 of adjacent cells are located on opposite sides of the primary winding of the transformer 29, provides further means of cancelling any differences Δ*in i*0 and Δ*i*1 in each of the digit planes P1, P2–P16.

Further, in accordance with the present invention, as illustrated by FIG. 1, the two resistors 21 and 22 of each of the memory cells 10 are disposed symmetrically about the differential transformer 29 for the respective digit plane P1. This symmetrical arrangement of resistors 21 and 22 provides equal propagation times for signals on the parallel outputs of each of the memory cells of any one word group. As a result, the required time coincidence of the output signals from the parallel circuit paths is produced in in each of the primary windings of the differential current transformers 29. The symmetrical circuit arrangement of memory cells 10 in any one of the word groups assures that each of the parallel output signals, and any difference current, in the parallel outputs of each memory cell of any one word group travels the same length path to the respective one of the differential current transformers 29. In view of the fast switching of the tunnel diodes (during readout of binary 1), the differential readout signals produced in the memory cells during switching from low to high current states are of very short time duration, i.e., one nanosecond or less. Accordingly, when read-write voltage pulses RP, WP are applied to the memory cell 10 during interrogation, it is not only desirable to reduce noise, but it is important that the parallel output signals arrive at the differential transformer 29 of the respective digit plane concurrently, and further, that the leading and trailing edges of the parallel output signals be substantially coincident in time in order to distinguish between switching of tunnel diodes from low to high current states during readout of a binary 1 digit stored in the cell 10 and readout of binary 0. Thus, in addition to providing parallel output signals of equal amplitude for readout of binary 0 and providing complete cancellation thereof during differential detection, the symmetrical circuit arrangement of the memory cells 10 in any one of the digit planes P1, P2–P16 (about the primary winding of the respective transformer 29) provides for time coincidence of the parallel output signals produced in response to each read pulse RP. As a result, readout of memory cells 10 in a binary 0 state produces substantially no differential current which can be readily distinguished from readout of cells 10 in a binary 1 state, producing a differential readout signal, e.g., SP1.

In order to demonstrate the importance of the symmetrical circuit arrangement of the memory cells 10 in the digit planes P1, P2–16, the timing diagram in FIG. 7 illustrates uncontrolled propagation delays in an unsymmetrical circuit arrangement for a memory cell. In the output of the unsymmetrical circuit arragnement, parallel output signals at the differential transformer of the respective digit plane would be displaced in time as shown by output signals in FIGS. 7*b* and 7*c*. It should be clear that the memory cells 10 and system of the present invention do avoid this problem of propagation time delay by the symmetrical circuit arrangement of the memory cells 10 provided in the various respective digit planes P1, P2–P16. However, in the absence of this symmetrical circuit arrangement of memory cells in any digit plane, read-write pulses RP, WP, shown in FIG. 7*a*, would produce parallel output signals (FIGS. 7*b* and 7*c*), which are displaced in time at the opposite sides of primary winding of the respective differential current transformer 29 because of differences in propagation time delay. Thus, in the absence of the symmetrical circuit arrangement of the present invention, although the waveforms of the parallel output signals (FIGS. 7*b* and 7*c*) represent identical signals, which are produced when no change in current ΔI is produced during readout of a binary 0 (no switching of the tunnel diode); differential currents (noise) are produced in the sense output, as shown by current waveforms in FIG. 7*d*, which cannot be distinguished from differential readout signals representing a binary 1. See, for example, the readout signal SP1 shown in FIG. 6*f*. The importance of this feature of the circuit arrangement of the present invention which avoids the propagation delays illustrated in FIG. 7 should now be readily apparent and additional features of the typical memory cell 10 (FIG. 3) will now be described particularly with reference to the series circuit including the tunnel diode 20 and series resistor 21.

Referring to FIGS. 1,3 and 8 for a more detailed description of the dynamic operating characteristics of the memory cells 10 and digit planes P1, P2–P16, the operating characteristic curve of FIG. 8 illustrates changes in current Δ*i*0 and Δ*i*1 of the tunnel diode and series resistor circuit of the typical memory cell 10 when digit pulse DP1 is applied to this cell while in binary 0 (high)

and binary 1 (low) current states, respectively. As shown in FIG. 1, the tunnel diode and series resistor circuits of alternate memory cells 10 of digit plane P1, for example, are disposed on opposite sides of the primary winding of transformer 29. This circuit arrangement for memory cells 10 provides substantially equal changes in current $\Delta i0$ and $\Delta i1$ to provide for balancing the signal outputs of tunnel diodes 20 of the digit plane P1 in response to digit pulses DP1 applied to the digit input D1 when writing a binary 1 in one of the memory cells 10 in the digit plane P1, for example. Thus, in order to further reduce the noise in the memory, the circuit arrangement of the memory cell 10 is determined by considerations involving dynamic operating conditions as well as static operating conditions, and more particularly, the nonlinearity of the tunnel diode operating characteristic in both of the regions of stable operation and not merely the maximum change in current $\Delta I$ which is capable of being produced during switching. This is possible because the balanced circuit arrangement of the memory cells 10 reduces the noise during readout so that smaller than maximum changes in current $\Delta I$, due to switching of tunnel diodes 20, are sufficient to produce readily distinguishable differential readout signals (e.g., SP1) at the sense outputs S*a*1, S*a*2–S*a*16. Accordingly, the symmetrical circuit arrangement of each of the individual memory cells 10 and the balanced arrangement of memory cell circuits in the digit planes P1, P2–16 provide a high signal to noise ratio such that operation is possible in stable state portions of nonlinear positive resistance regions on the tunnel diode operating characteristic where the changes in current $\Delta i0$ or $\Delta i1$ of the memory cells 10 are equal or very nearly equal. In view thereof, the changes in current $\Delta i0$ and $\Delta i1$ of unselected memory cells 10 of any one of the digit planes P1, P2–P16 are more nearly balanced, and any differential current (delta noise) in the sense outputs S*a*1, S*a*2–S*a*16 resulting from digit pulses (e.g., DP1) during writing is minimal. Accordingly, the memory of the present invention has a higher word storage capacity and is capable of operating at 15 megacycles rates and higher, which rates are well within the practical range of operation of the present memory system.

Referring now to FIG. 2, for a more detailed description of the operation thereof, the transformer array shown is provided for linear selection of any one of the word lines W1, W2, W3–W64 and corresponding word groups of the memory matrix shown in FIG. 1. Only a selected typical group of sixty-four linear transformers T1–T64 has been shown in FIG. 2 to more clearly illustrate the operation thereof. The linear transformers T1–T64 are arranged in rows and columns of eight transformers and selection of any one of the sixty-four transformers T1–T64 is provided by selection of only one of the row drive lines X1–X8 and only one of the column drive lines Y1–Y8 during each memory operating cycle. Each of the row lines X1–X8 is connected to a respective one of the tunnel diode row drivers 25. Each of the row drivers 25 has an input coupled to an address decoding matrix (not shown) which supplies the row drive pulse XP thereto, each memory operating cycle, to produce a drive pulse (e.g., pulse XP1) on the respective one of the row lines X1–X8 (e.g., line X1). Each of the column drive lines Y1–Y8 is connected to a respective one of tunnel diode column drivers 26 having an input which is coupled to the decoding matrix (not shown) which supplies column drive pulse YP thereto, each memory operating cycle, to produce a drive pulse (e.g., pulse YP1) on a respective one of the column drive lines Y1–Y8 (e.g., line Y1). As illustrated in FIG. 2, row drive pulse XP is coupled to the input of row driver 25 and column drive pulse YP is coupled to column driver 26 which have outputs connected to column drive lines X1 and Y1, respectively. The row and column drive pulse XP1 and YP1 produce a current in the primary winding 27 of transformer T1 to induce read-write pulses RP, WP in the secondary winding 28 which is connected to word drive line W1. In each of the subsequent memory cycles, selection of any one of the transformers T1–T64 is provided in a similar manner by application of a pair of row and column drive pulses XP and YP to a selected pair of row and column drivers 25 and 26 to produce drive pulses on the corresponding pair of the row and column drives lines X1–X8 and Y1–Y8. Drive pulses coupled to any selected one of the transformers T1–T64 produces read-write pulses RP, WP on the respective word drive line W1–W64.

Figure 5A:
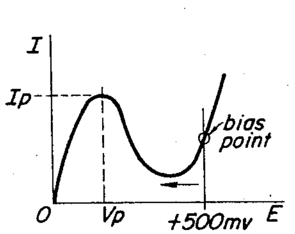
Figure 5B:
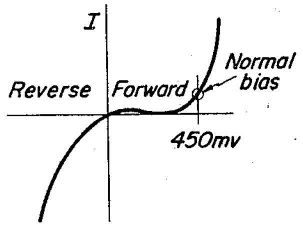
Figure 5C:
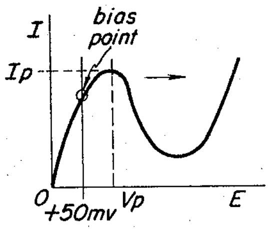

Referring now more particularly to the individual circuit shown in FIG. 2, the tunnel diode drivers 25 and 26 and the tunnel rectifiers 24, transformers T1–T64 provide low impedance sources for read-write pulses RP, WP for maintaining the proper voltage levels in the low voltage level regions of tuned diode operation whereby precise low level voltage amplitudes necessary for switching of the memory cells 10 in any word group are maintained (as shown in FIG. 6). The region of operation of the tunnel diode row drivers 25 is illustrated by the operating characteristic curve in FIG. 5*c*. The tunnel diode row drivers 25 are biased into the low current region on the tunnel diode's characteristic curve as shown by the bias point in FIG. 5*c*. The operation of the column drivers 26 is illustrated by the operating characteristic in FIG. 5*a*. The column drivers are biased in the high current state as shown by the bias point in FIG. 5*a*. The outputs of any selected pair of row and column drivers 25 and 26 produces a reverse bias across the tunnel rectifier 24 and the primary winding 27 of any selected one of the transformers T1–T64, for example, tunnel rectifier 24 and primary winding 27 of transformer T1. As shown by the operating characteristic curve of the tunnel rectifier 24 in FIG. 5*b*, the normal bias is shown on this characteristic curve as being a forward bias voltage of 450 mv., for example. During the period the drive pulses XP1, YP1 are applied to the pair of row and column drive lines X1 and Y1, a voltage (e.g., 450 mv.) is applied across the tunnel rectifier 24 in the reverse direction to produce the read pulse RP in secondary winding 28 of transformer T1, which read pulse RP is coupled to the word drive line W1 as shown in FIG. 1. The write pulse WP is generated on the word line W1 during the recovery of the transformer T1 which is during the time interval following the read pulse RP. The remaining unselected linear transformers W2–W64 do not produce outputs because the tunnel rectifiers 24 remain in high impedance state and block the current flow through the primary windings 27 thereof. For example, considering linear transformer T2, the row drive pulse XP1 on row drive line X1 raises the voltage of the row drive line to 500 millivolts, for example, which is the same voltage as is present on the column drive line Y2. During the drive pulse period, the voltage across the tunnel rectifier 24 is reduced to zero volts and no current flow is produced in the primary winding 27 of the transformer T2.

Briefly, therefore, read and write pulses RP, WP are produced on any selected one of the word lines W1–W64 (FIG. 1), as provided by the application of a pair of row and column drive pulses XP and YP (FIG. 2) to any selected pair of tunnel diode row and column drivers 25 and 26, to produce row and column pulses on the respective pair of the row and column drive lines X1–X8 and Y1–Y8. The pair of row and column drive pulses XP and YP produces a voltage pulse and voltage reversal across the tunnel rectifier 24 causing the tunnel rectifier to conduct in the reverse direction to pass current through the primary winding 27 of selected one of the transformers T1–T64, conducted to both of the selected pair of row and column drive lines X1–X8 and Y1–Y8, to induce a read pulse RP in the secondary winding 28 thereof. After the row and column drive pulses XP and YP terminate, the reverse current through the primary winding 27 of the selected one of the transformers T1–T64 ceases and this selected transformer recovers, generating the write pulse WP on the respective one of word lines W1–W64 connected to the secondary winding 28 thereof.

Figure 4:
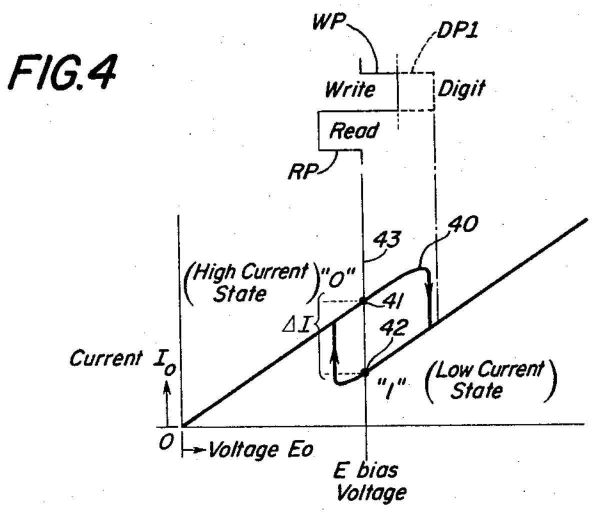
FIG. 4 shows the voltage-current loop characteristic of the typical memory element shown in FIG. 3 and also read-write and digit pulse waveforms for illustrating the operation of the present invention.

Briefly, the operation of the memory system arrangement of the present invention comprises selectively producing and applying read-write pulses RP, WP on a selected one of the word drive lines W1, W2, W3–W4, shown in FIG. 1, by the memory selection circuits, shown in FIG. 2, to readout and write binary digits 0 and 1 in the word group of memory cells 10 connected in parallel to a selected word line. The timing of pulses during a typical memory operating cycle is shown in FIG. 6. FIG. 4 illustrates the operation of the typical memory cell 10 of the selected word group in response to the read-write pulses RP, WP by the voltage-current loop 40. As shown, the pulse RP produces a change in current ΔI when the memory cell 10 is switched from a low current (binary 1) state at the point of intersection 42. The switching is produced as the read pulse RP reduces the voltage across the memory cell 10. It is this reduction in voltage that causes the tunnel diode to switch from low current state to the high current (binary 0) state at the point of intersection 41. The change in current ΔI produced during switching is detected by the differential transformer 29 (of the respective digit plane) to produce the differential readout signal (e.g., signal SP1 at sense output S*a*1).

After the read pulse RP, the write pulse WP and digit pulse DP1 will store a binary 1 in the memory cell 10 by causing the tunnel diode memory element to revert to the low current (binary 1) state as the voltage across the memory cell 10 is increased by the combination of write and digit pulses WP and DP1. In the absence of a digit pulse DP1, however the memory cell 10 will remain in the high current (binary 0) state. It should be clear from FIG. 4, that when the memory cell 10 is in a high current (binary 0) state and the read pulse RP is applied thereto that no change in state or change in current ΔI is produced and no differential readout signal is produced. The absence of a differential readout signal at the respective transformer 29, therefore, indicates the binary 0 state of the memory cell 10.

As illustrated by the typical memory cell 10 in FIG. 3, the differential read signal SP1 at the sense output S*a*1 is coupled to a sense amplifier 30 where it is amplified and shaped and the signals on output 31 are then coupled to a flip-flop M register (not shown), for example, for temporary storage therein. An output $M_1$ from the memory register is coupled to digit driver 32, via AND gate 33, for restoring the same memory cell 10 to the low current (binary 1) state during the immediately following write pulse WP. As shown in FIG. 3, a strobe pulse TP1 is coupled to the sense amplifier 30. This strobe pulse TP1 is gated to the sense amplifier 30 during read-memory operating cycles only. During read-memory cycles, the word of information read out of the selected word group of memory cells 10 is stored in the memory register, or otherwise utilized as desired, and also restored in the selected word group of cells in the memory matrix (FIG. 1). During a write-operating cycle of the memory, the strobe pulse TP1 is not gated and applied to the sense amplifier 30, but the timing pulse TP2 (FIG. 3) is applied to AND gate 33 in order to store the binary 1 output $M_1$, for example, in the memory cell 10. The digit driver 32 is responsive to the gated output $M_1$ to produce the digit pulse DP1. As described supra in connection with FIG. 4, combined digit and write pulses DP1 and WP produce a voltage causing the memory cell 10 to be switched to the low current (binary 1) state. As to the output $M_1$, this high level output represents the true (binary 1) state of a tunnel diode flip-flop, for example, of the memory register (not shown).

In view of the foregoing brief description of operation of the memory system of the present invention, it should be clear that during each memory cycle all of the memory cells 10 of any selected word group (FIG. 1) are operated in the same manner as the typical memory cell 10 as described in connection with FIGS. 3 and 4. Accordingly, each of the vertical digit planes P1, P2–P16 has a sense amplifier 30, digit driver 32, bias voltage (E bias) and other circuitry as shown from the typical memory cell 10 for digit plane P1. With regard to read-operating cycles of the memory, the flip-flops of the memory register (not shown) are reset of a false state by the clock pulse C (FIG. 6*a*) at the beginning of each read-operating cycle of the memory in order to be set by the output from the sense amplifier 30. However, for write-operating cycles of the memory, these flip-flops are not reset so that the binary data stored therein can be transferred to the selected word group of memory cells during the write pulse period of the write-operating cycle.

In the light of the above teachings, various modifications and variations of the present invention are contemplated and will be apparent to those skilled in the art without departing from the spirit and scope of the invention.

What is claimed is:

1. A tunnel diode memory system comprising: a memory matrix including a plurality of digit planes; a plurality of tunnel diode memory cells in each of said digit planes, said memory cells comprising a balanced circuit arrangement including a tunnel diode, a resistor connected in series with said tunnel diode to provide stable high and low current states representing binary signals 0 and 1 and a resistor connected in parallel with said tunnel diode and series resistor to provide parallel circuit paths; differentiating circuit means connected to said parallel paths of the memory cells in respective digit planes for detecting switching of said tunnel diodes from one stable state to the other stable state in response to read-voltage pulses by the change in current in one of the parallel circuit paths including said tunnel diode; selective circuit means for supplying read-write voltage pulses to any one word group of memory cells in separate digit planes for changing the state of said memory cells to readout and store words of digital data in said memory matrix, said selective circuit means comprising an array of linear transformers having primary windings and secondary windings and tunnel rectifiers connected in series with said primary windings, drive lines connected to said primary windings and tunnel rectifiers for supplying a forward voltage across said primary windings and tunnel rectifiers and a drive voltage pulse across any selected one of said primary windings by concurrent voltage pulses applied to a selected pair of said drive lines, each of said drive lines being connected to a plurality of said primary windings and any selected pair of drive lines being connected across a single primary winding and tunnel rectifier for producing a current in said single primary winding in response to said drive voltage pulse for inducing a read-voltage pulse across the respective secondary winding and a write-voltage pulse during the recovery of said transformer following said read-voltage pulse; and word lines individually coupling the secondary windings of said transformers to the memory cells of respective word groups for applying said read and write-voltage pulses to the memory cells of any selected one of said respective word groups for readout and storage of words of digital data in said memory system.

2. A memory system having operating cycles for random-access storage and retrieval of words of digital data comprising: a memory matrix including a plurality of digit planes and differential current detector circuits individual to each digit plane; a plurality of memory cells in each of said digit planes; a plurality of word lines, each word line being connected to a memory cell in each digit plane for selectively applying read-write voltage pulses to memory cells in any selected word group for readout and storage of a word of data during an operating cycle of said memory system; each of said memory cells comprising a voltage-controlled, negative-resistance tunnel diode connected in series with a resistor in a first parallel path for providing first and second stable current states and a resistor connected in a second parallel path, said parallel paths being connected to one of said word lines and to said differential current detector circuit of the respective digit plane to provide opposing signal outputs for detecting switching of said tunnel diodes from one stable current state to the other stable state in response to said read-voltage pulses; word selection circuits for supplying said read-write voltage pulses to any selected one of said word lines for selective readout and storage of words of digital data in said word groups during each operating cycle, said word selection circuits including an array of linear transformers, each of said transformers having a primary winding and a secondary winding magnetically coupled by a core of magnetic material providing linear operating characteristics for generating read-voltage pulses, and write-voltage pulses during recovery of said transformer after each read-voltage pulse, tunnel rectifiers having a low impedance in the reverse voltage direction connected in series with respective primary windings of said transformers, and circuit means including tunnel diode drivers and drive lines for supplying a forward voltage and selectively applying drive voltage pulses to the primary winding and series connected tunnel rectifier of any selected transformer to produce a reversal of the voltage across the selected tunnel rectifier and primary winding and a drive current in the primary winding to induce a read-voltage pulse in the secondary winding of the respective transformer and the word line connected to said secondary winding; said word group of memory cells connected to the selected word line being responsive to said read-voltage pulse to produce switching of tunnel diodes from the first to the second stable state and differential changes in current in parallel outputs of the respective memory cell, and no switching of tunnel diodes in the second stable state and no differential changes in current in parallel outputs to produce differential readout signals and the absence of readout signals, respectively, in differential current detection circuits of respective digit planes to provide readout signals in sense outputs representing only a predetermined one of the binary digits 0 and 1; digit driver circuit means individual to each digit plane for selectively producing a digit voltage pulse concurrent with said write-voltage pulse applied to a selected one of the word groups each operating cycle, said memory cells being responsive to concurrent digit and write-voltage pulses to switch the tunnel diodes from the second stable state to the first stable state for storing a predetermined one of said binary digits.

3. The memory system according to claim 2 in which each of said drive lines is connected to a plurality of said primary windings and any pair of drive lines is connected across the primary winding and series connected tunnel rectifier of a predetermined one of said transformers, and said drive lines are connected to the outputs of respective tunnel diode drivers to supply a pair of opposing drive voltage pulses to any selected pair of drive lines for producing said voltage reversal across the primary winding and series connected tunnel rectifier of the respective transformer each operating cycle of the memory system.

4. In a tunnel diode memory system, a memory matrix comprising: a plurality of memory digit planes; a plurality of tunnel diode memory cells in each of said digit planes; word lines for selectively applying read-voltage pulses to a word group of memory cells including one memory cell in each digit plane, said memory cells comprising a balanced circuit arrangement including a tunnel diode, a resistor connected in series with said tunnel diode to provide first and second different stable current states representing binary signals 0 and 1, and a resistor connected in parallel with said tunnel diode and said series resistor to provide parallel circuit paths and outputs for said memory cells; differential detector circuit means individual to each of said digit planes including a differential current transformer having a primary winding and a secondary winding, and circuit means connecting the said primary winding to the parallel circuit paths of each of the memory cells in respective digit planes to provide substantially equal propagation delay of parallel output signals produced in each memory cell of any selected word group and differential detection of said parallel signal outputs in response to read-voltage pulses applied to the respective word line.

5. In a tunnel diode memory, a plurality of tunnel diode memory cells arranged in memory digit planes, each of said memory cells comprising: a first circuit path; a tunnel diode in said first circuit path having a lower voltage region of positive resistance and a higher voltage region of positive resistance separated by an intermediate voltage region of negative resistance and having a peak current in said lower voltage region; a resistor connected in series with said tunnel diode, said resistor having an ohmic resistance value which is approximately equal to one thousand divided by the peak current of the tunnel diode in milliamperes to provide stable regions or approximately linear resistance and two stable states of high and low current in said stable regions in the lower and higher voltage regions of positive resistance; and a second circuit path in parallel with said first circuit path, said second circuit path including a resistor connected in parallel with said tunnel diode and resistor in said first circuit path and having a resistance which is approximately equal to the total resistance of the first circuit path when operating in said stable regions.

6. In a tunnel diode memory, a memory matrix comprising: a plurality of balanced memory digit planes, each of said digit planes including a plurality of memory cells and a sense output circuit providing differential current detection of said plurality of memory cells of the respective digit plane; each of said memory cells comprising a first and second parallel circuit path including a tunnel diode in said first circuit path having a nonlinear operating characteristic curve including a lower voltage region of nonlinear positive resistance and a higher voltage region of nonlinear positive resistance separated by an intermediate voltage region of negative resistance and having a peak current in said lower voltage region, and a resistor connected in series with said tunnel diode to provide stable regions of approximately linear resistance and two stable states of high and low current in predetermined portions of said lower and higher voltage regions of nonlinear positive resistance of said tunnel diode; said second circuit path including a resistor connected in parallel with said tunnel diode and resistor in said first circuit path and having a resistance which is approximately equal to the total resistance of the first circuit path when operating in said stable regions; said first and second circuit paths of each memory cell being connected in opposition at the respective digit plane sense output, and also alternate ones of said first circuit paths being connected in opposition at the respective sense output whereby digit voltage pulses applied to the memory cells of any of the digit planes produce opposing and approximately equal nonlinear changes in current according to said predetermined portions of the operating characteristic curve of said tunnel diodes, and produce opposing and approximately equal linear changes in current from said resistors in said second circuit paths.

7. A tunnel diode memory system for readout and storage of words of data in succesive operating cycles comprising: a memory matrix including a plurality of tunnel diode memory cells arranged in digit planes, each of said memory cells comprising first and second parallel circuit paths; a tunnel diode in said first circuit path having an operating characteristic curve including a lower voltage region of positive resistance and a higher voltage region of postive resistance separated by an intermediate voltage region of negative resistance and having a peak current in said lower voltage region; a resistor connected in series with said tunnel diode to provide stable regions of approximately linear resistance and first and second stable states of low and high current in said stable regions in predetermined sections of respective high and low voltage regions of positive resistance, said second circuit path including a resistor connected in parallel with said tunnel diode and resistor in said first circuit path and having a resistance which is approximately equal to the total resistance of the first circuit path when operating in said stable regions; selective circuit means including a source of read-write pulses for supplying said pulses to any one selected word group of memory cells in respective digit planes and connected in parallel to a respective word line; each of said digit planes including differential sense output circuit means coupled to each of said first and second circuit paths to place parallel outputs of each of the memory cells in the respective digit plane in opposition to detect changes in current of tunnel diodes switching from said first stable state to second stable state to produce differential readout signals; sense amplifiers connected to said sense outputs for amplifying said readout signals; digit circuit means individual to each of said digit planes, each of said digit circuit means being capable of supplying a digit voltage pulse to all of the memory cells of the respective digit plane for storing binary digit signals in any selected word group of memory cells including one memory cell in each digit plane; and each of said memory cells in the respective digit planes being in various first and second stable states and producing approximately the same changes in current in said first circuit paths and approximately the same changes in current in said second circuit paths in response to digit pulses only, each of said digit planes being constructed and arranged whereby changes in current produced in first circuit paths are opposing in the sense output of the respective digit planes whereby the corresponding changes in current in first and second circuit paths are opposing in order to reduce differential current in the sense outputs during writing and thereby reduce the time necessary for sense amplifiers to recover for the next operating cycle for high speed operation.

References Cited by the Examiner

Amodei, J. J., and Kosonocky, W. F., "Nondestructive Tunnel Diode Memory Cell," RCA TN No. 468, September 1961, TK6554, R2*t*.

JAMES W. MOFFITT, *Acting Primary Examiner.*

J. BREIMAYER, *Assistant Examiner.*